US006210723B1

(12) United States Patent
Coleman et al.

(10) Patent No.: US 6,210,723 B1
(45) Date of Patent: Apr. 3, 2001

(54) DOUGH ENROBED CHEESE FILLING

(75) Inventors: Edward C. Coleman, New Fairfield, CT (US); Sharon R. Birney, Yorktown Heights, NY (US); Twyla P. Stubblefield, Chestnut Ridge, NY (US); Robert J. Martin, Warwick, NY (US); Raymond J. Laudano, Grayslake, IL (US); Rita W. Brander, New Rochelle, NY (US)

(73) Assignee: Kraft Foods, Inc., Northfield, IL (US)

( * ) Notice: Subject to any disclaimer, the term of this patent is extended or adjusted under 35 U.S.C. 154(b) by 0 days.

(21) Appl. No.: 09/254,528

(22) PCT Filed: Jul. 9, 1998

(86) PCT No.: PCT/US98/14163

§ 371 Date: Jun. 4, 1999

§ 102(e) Date: Jun. 4, 1999

(87) PCT Pub. No.: WO99/02039

PCT Pub. Date: Jan. 21, 1999

Related U.S. Application Data

(60) Provisional application No. 60/053,079, filed on Jul. 9, 1997.

(51) Int. Cl.[7] .............................. A21D 13/00; A23G 3/00; A23P 1/08

(52) U.S. Cl. ......................... 426/94; 426/275; 426/496; 426/549; 426/556

(58) Field of Search .................................. 426/549, 556, 426/94, 275, 496

(56) References Cited

U.S. PATENT DOCUMENTS

| 4,156,021 | * | 5/1979 | Richardson | 426/104 |
| 4,721,622 | * | 1/1988 | Kingham et al. | 426/94 |
| 4,883,678 | | 11/1989 | Tashiro | 426/496 |
| 5,009,903 | * | 4/1991 | deFigueiredo et al. | 426/243 |
| 5,153,010 | | 10/1992 | Tashiro et al. | 425/287 |
| 5,194,271 | * | 3/1993 | Yasosky | 426/92 |
| 5,223,277 | | 6/1993 | Watanabe et al. | 425/132 |
| 5,409,717 | | 4/1995 | Apicella et al. | 426/19 |
| 5,532,018 | * | 7/1996 | Miller et al. | 426/582 |

OTHER PUBLICATIONS

Formulating Food Products with Methocel® Gums, D.A. Bell Product Bulletin of Dow Chemical Company, Feb. 1996.

* cited by examiner

*Primary Examiner*—Nina Bhat
(74) *Attorney, Agent, or Firm*—Thomas A. Marcoux

(57) ABSTRACT

A baked food product comprised of a yeast-leavened, bread-like crust completely enrobing a cheese filling. The product may be shaped for reheating in a toaster or toaster oven or on a grill. The filling may have particulate food particulates added, such as diced meat and/or vegetables.

10 Claims, No Drawings

DOUGH ENROBED CHEESE FILLING

This application was filed under 35 U.S.C. §371 based upon P.C.T. application Ser. No. PCT/US98/14163 having an international filing date of Jul. 9, 1998 and claims benefit of U.S. Provisional patent application Ser. No. 60/053,079 filed Jul. 9, 1997.

TECHNICAL FIELD

This invention is directed to a pre-baked product which is intended to be distributed in a refrigerated and/or frozen state and reheated by the consumer, such as in a toaster or toaster oven or on a grill, prior to consumption. The product is comprised of a filling, typically a cheese filling, which is fully enrobed in a dough crust to simulate a sandwich. The filing may contain flavors and/or particulate material, such as cubes of meat and/or vegetables.

DISCLOSURE OF THE INVENTION

This invention will be described with respect to a cheese filling. The filling is formulated such that when the product is baked or reheated the filling does not boil-out from the surrounding dough. During storage the filling retains moisture such that the baked dough does not become soggy and the filling has a creamy texture when the product is reheated by the consumer. The preferred filling is a dry-blended mixture which contains on a weight basis on a weight basis 94–99% process cheese ingredient, The process used to formulate the dough for this invention include the typical dough making steps of: preparing a dough by mixing flour, (preferably having a protein-content of 11.5–13% by weight), water, yeast, salt, and saccharides, a freshness-promoting combination of a starch-degrading enzyme and emulsifier and shortening, the ingredients being present in proportions effective to produce an extrudable dough. The total content of the dough should be in the range of 14–16 Baker's percent.

One or more additional ingredients such as gum, vital wheat gluten, egg components and preservative may also be present. Typically the preservative (in an aqueous solution) is sprayed onto the product after baking. Suitable ingredient ranges are as follows:

| Ingredient | Bakers Percent |
|---|---|
| Flour | 100 |
| Water | 55–65 |
| High Fructose Corn Syrup (71% solids, 42% fructose) | 5–8 |
| Dry Instant Yeast | 1–2 |
| Salt | 1–5 |
| Wheat Gluten | 1–4 |
| Egg White Solids | 0.5–3 |
| Mono- & Diglycerides | 0.5–2 |
| Enzyme | 0.2–2 |
| Gum | 0.1–0.8 |
| Partially Hydrogenated Vegetable Oil | 8–14 |
| Preservative | 0.01–0.5 |

The dough and the filling are combined to form a completely dough enrobed filling simulating a sandwich (i.e., top and bottom crust layer with sealed edges and a middle layer of cheese) or a filled tube (i.e., outer cylindrical crust with sealed ends and inner rod of filling). The dough enrobed product is proofed, baked, cooled and packaged, preferably vacuum packed in plastic film having an oxygen barrier layer such as ethylene vinyl alcohol. Before packaging the product may be sprayed with a preservative, such as an aqueous solution of potassium sorbate. The product may be formulated to have at least a 90-day refrigerated shelf-life.

Suitable equipment to enrobe the filling is produced by Rheon Automatic Machinery Co., Ltd. Tsunoniya, Japan and is generally described in U.S. Pat. Nos. 4,883,687 and 5,223,277 which are hereby incorporated by reference. This equipment can produce a spherical or other shaped body consisting of a dough crust surrounding a filling. This body can then be molded into a desired shape. According to one embodiment of this invention a spherical body is shaped to a relatively flat, oval-shaped product by means of rollers. Alternatively the product of this invention could be produced by suitable dough sheeting and laminating apparatus and crimping devices such that the filling is completely enrobed. The maximum thickness of the unbaked, sandwich-type product should not exceed about 2.5 cm and preferably be on the order of 1.3 cm. This size will enable the baked product to be utilized in most household toaster.

The enrobing equipment may also be utilized to form an elongated, cylindrical product akin to the shape of a hot dog. A typical length for such a formed product is about 12–20 cm in length and about 2–4 cm in diameter. This shape, which is not compatible with toaster, could be reheated in a toaster oven or on a grill, such as the well-known roll grills commonly used to cook hot dogs in commercial establishments.

The products of this invention will desirably contain (weight basis prior to baking) 25 to 70% filling (including any particulates) and 30 to 75% dough. After baking the water activity of the crust and of the filling should be within 0.006 units. preferably within 0.04 units and most preferably within 0.002 units. Proper selection of dough and filling ingredients and baking conditions will enable this result.

The sandwich-type baked product will typically have crust layers having a thickness of about 0.2–0.5 cm and a filling layer having a thickness of about 0.5–1 cm. The cylindrical-shaped baked product will typically have an overall diameter of about 2–6 cm and a filling diameter of about 1–3 cm.

EXAMPLE 1

| Cheese Filling Ingredients | Parts by Weight |
|---|---|
| Restricted Melt Process Cheese Shreds | 72.3 |
| Regular Melt Process Cheese Shreds | 24.1 |
| Hydroxypropyl Methylcellulose (100 mPas @ 2% conc., 20° C.) | 0.7 |
| Disodium Phosphate | 0.8 |
| Pregelatinized Tapioca Starch | 2.0 |
| Water Activity | 0.92 |
| Moisture Content | 37% |
| pH | 5.7 |

| Dough Ingredients | Baker's % |
|---|---|
| Wheat Flour (12% protein) | 100% |
| Water | 62.0 |
| High Fructose Corn Syrup | 6.0 |
| Dry Yeast | 1.4 |
| Salt | 2.5 |
| Wheat Gluten | 3.0 |
| Egg White Solids | 1.0 |

| Dough Ingredients | Baker's % |
|---|---|
| Mono- & Diglycerides | 2.0 |
| Enzyme (NOVAMYL ® 1500 Manu/g) | 0.3 |
| Guar Gum | 0.2 |
| Shortening | 11.0 |
| Calcium Propionate | 0.3 |

The methylcellulose, disodium phosphate and starch are dry blended. The dry blend is added to the shredded cheeses and tumbled for 3–5 minutes at a mix temperature of about 4.5° C. This blend is then mixed in a mixer (Hobart™ mixer at speed 2) for about 4 minutes until a pasty consistency is achieved having a temperature of about 10° C. The paste is then enrobed in a dough matrix using a Rheon Cornucopia™ Encruster (model KN200) which forms an essentially spherically-shaped body weighting about 100 g and consisting of a thin dough shell (65%) completely enrobing the cheese filling (35%). The spherical body is flattened and shaped with rollers to produce an oval-shaped product about 11.5×10×1.3 cm. The shaped product is then proofed for 1.5 hours at 37° C. and 85% relative humidity. The product is then baked at 230–260° C. until an internal temperature of 93.3° C. is achieved. The cheese filling was completely retained within the crust. The baked product is then cooled at ambient for about one hour, sprayed with an aqueous solution of potassium sorbate and vacuum packed in a plastic barrier film pouch which had been backflushed with an inert gas (75% nitrogen/25% carbon dioxide).

The product was stable under refrigerator conditions for at least 90 days. On reheating in a toaster oven the product exhibited thin, bread-like top and bottom crusts and a middle layer of melted cheese filling which had a creamy texture.

EXAMPLE 2

A comparable product was prepared as in Example 1 using a meat-containing filling. The composition of the filling was as follows:

| Ingredient | Parts by Weight |
|---|---|
| Ham cubes | 49.3 |
| Restricted Melt Process Cheese Shreds | 49.3 |
| Methyl Cellulose (400 mPas @ 2% conc, 20° C.) | 0.3 |
| Pregelatinized Tapioca Starch | 1.0 |

EXAMPLE 3

A comparable product was prepared as in Example 1 using the filling composition which follows:

| Ingredient | Parts by Weight |
|---|---|
| Seasoned Beef | 49.8 |
| Regular Melt Pasteurized Process Cheese Shreds | 23.4 |
| Restricted Melt Pasteurized Process Cheese Shreds | 23.4 |
| Flavors and Seasonings | 3.4 |

EXAMPLE 4

A comparable product was prepared as in Example 1 using the filling composition which follows:

| Ingredient | Parts by Weight |
|---|---|
| Restricted Melt Mozzarella Cheese Shreds | 22.79 |
| Regular Melt Mozzarella | 22.79 |
| Diced Pepperoni | 28.57 |
| Tomato Paste | 23.85 |
| Seasoning | 0.86 |
| Pregelatinize Tapioca Starch | 0.81 |
| Methyl Cellulose (Methocel ® 4AC -Dow Chemical Co.) | 0.33 |

Having thus described the invention what is claimed is:

1. An elongated, cylindrical, frozen baked food product comprised of a cheese filling enrobed in a baked, yeast-leavened crust, wherein the crust has a bread texture and contains a starch degrading enzyme and the cheese filling, excluding particulate, contains 0.2 to 2.0 % by weight of water-soluble hydrocolloid gum.

2. The product of claim 1 which prior to baking is comprises of 25–70% filling and 30–75% dough.

3. The product of claim 1 wherein the baked product is hot-dog shaped and sized to be heated on a roller grill and has a diameter of about 2–4 cm and a length of about 12–20 cm.

4. The product of claim 1 wherein the gum is a methylcellulose gum.

5. The product of claim 1 wherein the cheese filling, excluding particulates, contains 0.5–4% pregelantized starch.

6. The product of claim 5 wherein the starch is tapioca starch.

7. The product of claim 1 wherein particulate material selected from the group consisting of meat, vegetable and combinations thereof, is incorporated into the filling.

8. The product of claim 1 wherein the dough for the baked crust contains from 0.2–2% of starch-degrading enzyme.

9. The product of claim 1 wherein the dough for the baked crust has a protein content 14–16%.

10. The product of claim 1 wherein the dough for the baked crust contains 8–14% of partially hydrogenated vegetable oil.

* * * * *

UNITED STATES PATENT AND TRADEMARK OFFICE
CERTIFICATE OF CORRECTION

PATENT NO.    : 6,210,723 B1                                    Page 1 of 1
DATED         : April 3, 2001
INVENTOR(S)   : Edward C. Coleman, Sharon R. Birney, Twyla R. Stubblefield, Robert J. Martin
                Raymond J. Laudano, Rita W. Brander, Keith D. Forneck It is certified that error appears in the above-identified patent and that said Letters Patent is hereby corrected as shown below:

<u>Title page,</u>
Insert Keith D. Forneck, Hanover Park, IL (U.S.) - as last named inventor.

Signed and Sealed this

Nineteenth Day of February, 2002

*Attest:*

JAMES E. ROGAN
*Attesting Officer*                *Director of the United States Patent and Trademark Office*